United States Patent
Hu et al.

(10) Patent No.: US 9,905,097 B2
(45) Date of Patent: Feb. 27, 2018

(54) SECURITY DEVICE, SECURITY SYSTEM AND METHOD

(71) Applicant: HON HAI PRECISION INDUSTRY CO., LTD., New Taipei (TW)

(72) Inventors: Chi-Chin Hu, New Taipei (TW); Chung-Hua Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 323 days.

(21) Appl. No.: 14/794,152

(22) Filed: Jul. 8, 2015

(65) Prior Publication Data

US 2016/0307421 A1 Oct. 20, 2016

(30) Foreign Application Priority Data

Apr. 16, 2015 (TW) .............................. 104112293 A

(51) Int. Cl.
*G08B 13/196* (2006.01)
*G01L 7/00* (2006.01)
*G08B 13/08* (2006.01)

(52) U.S. Cl.
CPC .......... *G08B 13/19695* (2013.01); *G01L 7/00* (2013.01); *G08B 13/08* (2013.01)

(58) Field of Classification Search
CPC ........................ G08N 13/19685; G08N 13/08

USPC .......................................................... 348/143
See application file for complete search history.

(56) References Cited

U.S. PATENT DOCUMENTS

| | | | | |
|---|---|---|---|---|
| 5,259,553 A | * | 11/1993 | Shyu ....................... | F24F 1/022 165/224 |
| 2004/0155112 A1 | * | 8/2004 | Matsuda .......... | G08B 13/19621 235/472.02 |
| 2004/0233284 A1 | * | 11/2004 | Lesesky ........... | G08B 13/19619 348/148 |
| 2007/0018798 A1 | * | 1/2007 | Chen ................... | B60R 25/1003 340/425.5 |
| 2016/0189496 A1 | * | 6/2016 | Modi ..................... | G08B 13/08 340/545.2 |

* cited by examiner

*Primary Examiner* — Mohammed Rahaman
*Assistant Examiner* — Jimmy S Lee
(74) *Attorney, Agent, or Firm* — ScienBiziP, P.C.

(57) ABSTRACT

A security device and method receives gas pressure signals from a pair of gas pressure sensors, one set at the inside and the other at the outside of a door or a window. Gas pressure values for the signals (of the indoor and outdoor environments) are obtained and a camera, working in the same location as the pair of sensors, is controlled to capture photos or videos when it is determined that the gas pressure values of both sensors have changed and magnitude of the changes are both within a preset gas pressure range. Photos and videos are captured by the camera and transmitted to at least one validated contact according to preset contact information.

15 Claims, 2 Drawing Sheets

SECURITY DEVICE, SECURITY SYSTEM AND METHOD

CROSS-REFERENCE TO RELATED APPLICATION

This application claims priority to Taiwanese Patent Application No. 104112293 filed on Apr. 16, 2015, the contents of which are incorporated by reference herein.

FIELD

The subject matter herein generally relates to building security.

BACKGROUND

A building is constructed to allow people access and to provide ventilation to occupants of the building. However, the entries to a building as well as windows make the building vulnerable to break-in. Security systems typically rely on motion detectors, cameras, or entry detectors that are magnetic.

BRIEF DESCRIPTION OF THE DRAWINGS

Implementations of the present technology will now be described, by way of example only, with reference to the attached figures.

DETAILED DESCRIPTION

Figure 1:
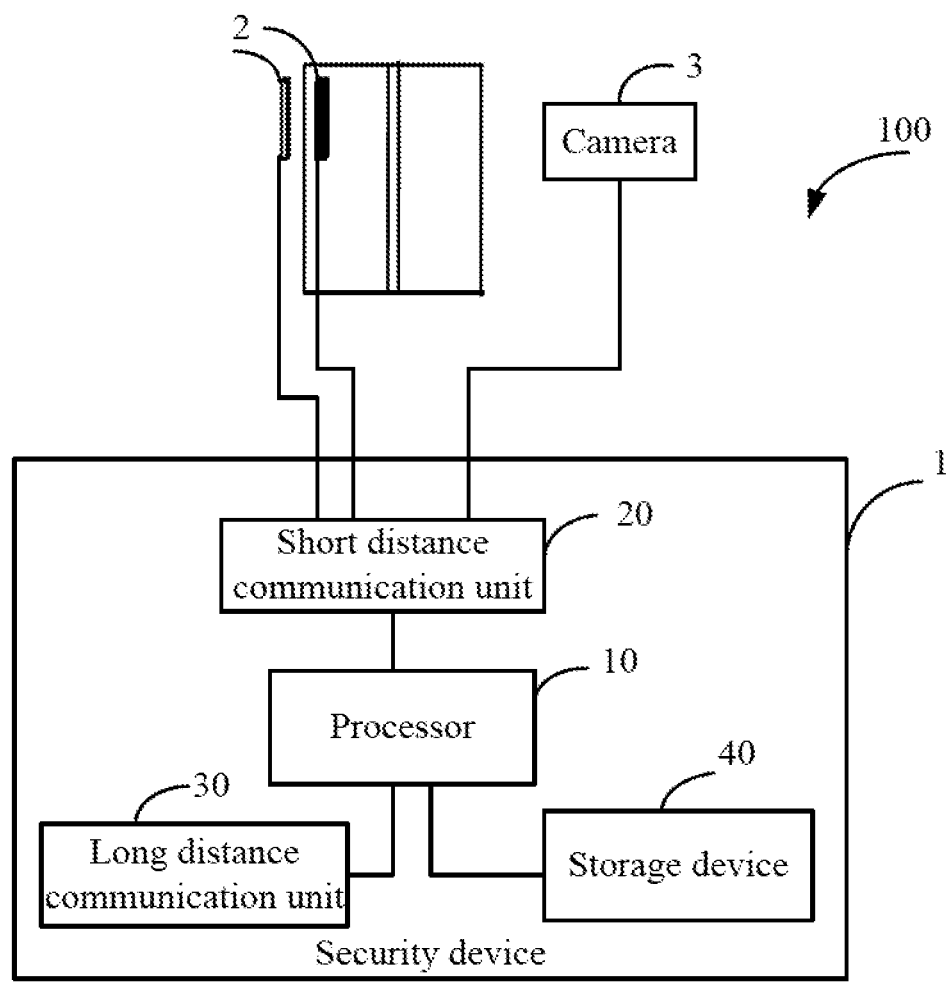
FIG. 1 is a block diagram of a security system of one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like. The connection can be such that the objects are permanently connected or releasably connected.

FIG. 1 illustrates a security system 100 of one embodiment. The security system 100 includes a security device 1, at least one pair of gas pressure sensors 2, and at least one camera 3.

Of each pair of gas pressure sensors 2, one is set at inside of a door or a window of a house, and the other is set at outside of the door or the window of the house. For example, a first gas pressure sensor 2 may be set at an outer surface of a frame of the door or the window, and a second gas pressure sensor 2 may be set at an inner surface of the door or the window, and aligned to the first gas pressure sensor 2. Each camera 3 is set to capture images of the scene around the door and window. The number of pairs of gas pressure sensors 2 is equal to the number of cameras 3. In one embodiment, there is one pair of gas pressure sensors 2 and there is one camera 3. The gas pressure sensors 2 and the camera 3 are always located close to each other, the three devices working together during a single burglary event.

In another embodiment, the number of pairs of gas pressure sensors 2 is two and the number of cameras 3 is also two. Each combination of camera-and-sensor-pair is set at different locations. For example, one pair of gas pressure sensors 2 are set at the inside and outside of a door, and another pair of gas pressure sensors 2 is set at the inside and outside of a window. One camera 3 is set at the inside or outside of the door, and another camera 3 is set at the inside or outside of the window. In other embodiment, the number of camera-and-sensor-pair combinations can be selected as required.

Each gas pressure sensor 2 can detect a gas pressure value of current environment and generates a gas pressure signal reflecting the gas pressure value. Therefore, each pair of gas pressure sensors 2 can detect gas pressure values of both an indoor environment and an outdoor environment and generates respective the gas pressure signals reflecting the gas pressure values of those respective environments. The camera 3 can capture photos and videos.

The security device 1 is connected to each gas pressure sensor 2 and each camera 3 via a wired connection or a wireless connection. The security device 1 includes a processor 10, a short distance communication unit 20, a long distance communication unit 30, and a storage device 40. The security device 1 is connected to each gas pressure sensor 2 and each camera 3 via the short distance communication unit 20. The short distance communication unit 20 can be a WIFI® module, a BLUETOOTH® module, a near field communication (NFC) module, or a connection port (such as a universal serial bus port). The long distance communication unit 30 can be a network card, a subscriber identity module (SIM) card, or the like, and can communicate with at least one validated contact when the validated contact is out of the house. The validated contact can be a host of the house.

The storage device 40 stores a preset gas pressure range and preset contact information for at least the one validated contact.

In one embodiment, the processor 10 can be a central processing unit, a digital signal processor, or a single chip, for example. In at least one embodiment, the storage device 40 can be an internal storage system, such as a flash memory, a random access memory (RAM) for temporary storage of information, and/or a read-only memory (ROM) for permanent storage of information. The storage device 40 can also be a storage system, such as a hard disk, a storage card, or a data storage medium. The storage device 40 can include volatile and/or non-volatile storage devices. In at least one embodiment, the storage device 40 can include two or more storage devices such that one storage device is a memory and the other storage device is a hard drive. Additionally, one or more of the storage devices 40 can be located either entirely or partially external relative to the security device 1.

The processor 10 receives the gas pressure signals generated by the at least one pair of gas pressure sensors 2, and obtains the gas pressure values of the indoor and outdoor environments according to the gas pressure signals. The processor 10 further controls the camera to capture photos or videos when it determines that the gas pressure values of both of indoor and outdoor environments, as detected by a pair of gas pressure sensors 2 are changed, and magnitude of the changes of the gas pressure values as detected by the pair of gas pressure sensors 2 are both within the preset gas pressure range stored in the storage device 40.

The processor 10 receives the gas pressure signals generated by the at least one pair of gas pressure sensors 2 at intervals (such as every 2 seconds), or constantly, and obtains the gas pressure values of the indoor and outdoor environments. The processor 10 further compares the obtained gas pressure values of indoor environment and outdoor environment to the previous gas pressure values to determine whether the gas pressure values have changed and if so, determines the magnitudes of any changes.

The processor 10 does not control the camera 3 to capture photos or videos if the gas pressure values are unchanged or the magnitudes of changes of the gas pressure values of indoor and outdoor environments are not both within the preset gas pressure range.

If the gas pressure values have changed and the magnitudes of changes of the gas pressure values of indoor and outdoor environments are both within the preset gas pressure range, the processor 10 transmits the photos and videos captured by the camera 3 to the at least one validated contact according to the contact information stored in the storage device 40. In the embodiment, the contact information can be a telephone number of the at least one validated contact or an account of an instant messaging software. The processor 10 can transmit the photos and videos captured by the camera 3 to the at least one validated contact via a multimedia message or the instant messaging software.

In one embodiment, the processor 10 can generate or modify the preset gas pressure range and the preset contact information in response to operations of the validated contact and store the generated or changed information to the storage device 40.

When a door or a window is opened suddenly, both of the gas pressure values of the indoor and outdoor environments would be changed. Such changes in gas pressure values, at the same door or at the same window, will be substantially the same. Therefore, when the gas pressure values of indoor and outdoor environments are changed and the magnitudes of changes are both within the preset gas pressure range, that means the door or the window covered by the pair of gas pressure sensors must have been opened. Therefore, the captured photos or videos, which are transmitted to the validated contact under the control of the processor 10, can indicate and prompt the validated contact as to the reason for the change.

In one embodiment, when the number of sensor pairs is greater than one, such as when there are two pairs of gas pressure sensors 2 or three pairs of gas pressure sensors 2, the processor 10 further associates each sensor pair setting at the door or window with a camera 3 setting at the same door or window in response to a setting operation of the validated contact. In the embodiment, the processor 10 associates the two pressure sensors 2 with the camera 3 by associating device identification codes of the two pressure sensors 2 and the camera 3. In the embodiment, the device identification codes of the two pressure sensors 2 can be hardware serial numbers or user-defined names of the two pressure sensors 2.

In one embodiment, the security device 1 can be an electronic device with input/output mechanism, such as a portable computer, a tablet computer, a desktop computer, or the like. When the validated contact sets the pairs of gas pressure sensors 2 and cameras 3 to operate at several doors and windows, the validated contact can connect the security device 1 to all of the gas pressure sensors 2 and cameras 3 via the short distance communication unit 30, and bind the device identification codes of a pair of pressure sensors 2 with a corresponding camera 3 to associate one pair of pressure sensors 2 with a camera 3.

In one embodiment, when the processor 10 determines that the gas pressure values detected by two gas pressure sensors 2 are changed and magnitude of the changes both are within the preset gas pressure range, the processor 10 further determines whether or not the two gas pressure sensors 2 are associated with each other. If yes, namely that the two gas pressure sensors 2 are associated with each other, the processor 10 determines the particular camera 3 associated with the two gas pressure sensors 2 and controls the determined camera 3 to capture the photos and videos. If not, namely that the two gas pressure sensors 2 are not associated with each other, the processor 10 does not control the camera 3 to capture the photos and videos.

In other embodiments, the processor 10 can control the camera 3 to capture photos or videos and transmit the photos or videos to the validated contact when determining that the gas pressure values detected by any two gas pressure sensors 2 are changed and magnitude of the changes are both within the preset gas pressure range.

Figure 2:
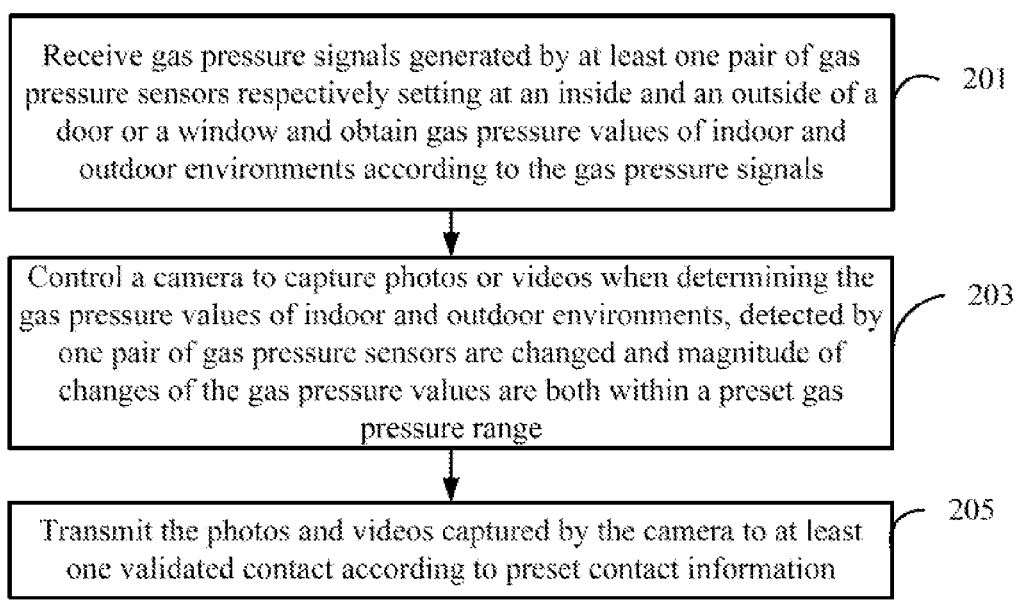
FIG. 2 is a flowchart illustrating a security method of one embodiment.

FIG. 2 illustrates a flowchart of a security method. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, a processor receives the gas pressure signals generated by the at least one pair of gas pressure sensors respectively set at an inside and an outside of a door or a window, and the processor obtains the gas pressure values of the indoor and outdoor environments according to the gas pressure signals.

At block 203, the processor further controls a camera to capture photos or videos of the scene when determining that the gas pressure values detected by any pair of gas pressure sensors are changed, and magnitude of the changes of the gas pressure values are both within a preset gas pressure range. The processor receives the signals generated by the at least one pair of gas pressure sensors at intervals or constantly, and the processor obtains the gas pressure values when the gas pressure signals are received. The processor compares currently obtained gas pressure values against the gas pressure values obtained previously. The processor then determines whether the gas pressure values of indoor and outdoor environments are changed and, if so, determine the magnitude of the changes.

At block 205, the processor transmits the photos and videos captured by the camera to at least one validated contact using preset contact information.

In one embodiment, the method further includes the step of: the processor further generates or modifies the preset gas pressure range and the preset contact information in response to operations of the validated contact, and stores the generated or modified information to a storage device.

In one embodiment, the method further includes: the processor further associates the pair of gas pressure sensors setting at each door or each window with the camera set at the same door or window when the number of pairs of gas pressure sensors is greater than one, in response to a setting operation of the validated contact. When the processor determines that the gas pressure values detected by two gas pressure sensors are changed and magnitude of the changes are both within the present gas pressure range, the processor can determine whether or not the two gas pressure sensors are associated with each other. If they are associated with each other, the processor determines the camera associated with the pair of sensors and controls the determined camera to capture photos and videos.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A security device comprising:
a processor;
a storage device coupled to the processor storing a preset gas pressure range and preset contact information of at least one validated contact;
a short distance communication unit coupled to the processor and configured to connect to at least one pair of gas pressure sensors and at least one camera, wherein each pair of gas pressure sensors are respectively set at inside or outside of a door or a window of a house and each camera is set at the door or the window; and
a long distance communication unit coupled to the processor and configured to transmit data to the at least one validated contact;
wherein the processor is configured to receive gas pressure signals generated by the at least one pair of gas pressure sensors, obtain gas pressure values of indoor environment and outdoor environment according to the gas pressure signals, and control the at least one camera to capture photos or videos when determining the gas pressure values of indoor environment and outdoor environment detected by one pair of gas pressure sensors are changed and magnitudes of changes of the gas pressure values detected by the pair of gas pressure sensors are both within the preset gas pressure range, wherein the processor receives the gas pressure signals generated by the at least one pair of gas pressure sensors at intervals, and obtains the gas pressure values of indoor environment and outdoor environment each time when receiving the gas pressure signals, and compares currently obtained gas pressure values of indoor environment and outdoor environment to the gas pressure values of indoor environment and outdoor environment obtained previously, to determine whether the gas pressure values of indoor environment and outdoor environment are changed and determine the magnitudes of the changes; and the processor is further configured to transmit the photos and videos captured by the at least one camera to the at least one validated contact according to the preset contact information stored in the storage device.

2. The device according to claim 1, wherein the processor is further configured to generate or modify the preset gas pressure range and the preset contact information in response to operations of the validated contact and store the preset gas pressure range and the preset contact information to the storage device.

3. The device according to claim 2, wherein when an amount of the at least one pair of gas pressure sensors is greater than one, the processor is further configured to associate two pressure sensors of each pair of gas pressure sensors setting at one door or window with the camera setting at the same door or window in response to a setting operation of the validated contact.

4. The device according to claim 3, wherein the processor is further configured to judge whether two gas pressure sensors are associated with each other when determining the gas pressure values detected by two gas pressure sensors are changed and the magnitude of the changes both are within the preset gas pressure range, and further control the determined camera to capture the photos and videos when judging the two gas pressure sensors are associated with each other.

5. The device according to claim 3, wherein the processor associates the two pressure sensors and the camera by associating device identification codes of the two pressure sensors and the camera.

6. A security system comprising:
at least one pair of gas pressure sensors, wherein each pair of gas pressure sensors are set at inside or outside of one door or one window of a house and are configured to detect gas pressure values of indoor environment and outdoor environment and generate gas pressure signals respectively reflecting the gas pressure values of the indoor and outdoor environments;
at least one camera, wherein each camera is set at the door or the window; and
a security device comprising:
a processor;
a storage device coupled to the processor storing a preset gas pressure range and preset contact information of at least one validated contact;
a short distance communication unit coupled to the processor and configured to connect to the at least one pair of gas pressure sensors and at least one camera; and
a long distance communication unit coupled to the processor and configured to transmit data to the at least one validated contact;
wherein the processor is configured to receive gas pressure signals generated by the at least one pair of gas pressure sensors, obtain gas pressure values of indoor environment and outdoor environment according to the gas pressure signals, and control the camera to capture photos or videos when determining the gas pressure values of indoor environment and outdoor environment detected by one pair of gas pressure sensors are changed and magnitudes of changes of the gas pressure values detected by the pair of gas pressure sensors are both within the preset gas pressure range, wherein the processor receives the gas pressure signals generated by the at least one pair of gas pressure sensors at intervals, and obtains the gas pressure values of indoor environment and outdoor environment each time when receiving the gas pressure signals, and compares currently obtained gas pressure values of indoor environment and outdoor environment to the gas pressure values of indoor environment and outdoor environment obtained previously, to determine whether the gas pressure values of indoor environment and outdoor environment are changed and determine the magnitudes of the changes; and the processor is further configured to transmit the photos and videos captured by the camera to the at least one validated contact according to the preset contact information stored in the storage device.

7. The system according to claim 6, wherein the processor is further configured to generates or modify the preset gas pressure range and the preset contact information in response to operations of the validated contact and store the preset gas pressure range and the preset contact information to the storage device.

8. The system according to claim 7, wherein when an amount of the at least one pair of gas pressure sensors is greater than one, the processor is further configured to associate two pressure sensors of each pair of gas pressure sensors setting at one door or window with the camera setting at the same door or window in response to a setting operation of the validated contact.

9. The system according to claim 8, wherein the processor is further configured to judge whether two gas pressure sensors are associated with each other when determining the gas pressure values detected by two gas pressure sensors are changed and the magnitudes of changes both are within the preset gas pressure range, and further control the determined camera to capture the photos and videos when judging the two gas pressure sensors are associated with each other.

10. The system according to claim 8, wherein the processor associates the two pressure sensors and the camera by associating device identification codes of the two pressure sensors and the camera.

11. A security method comprising:
receiving gas pressure signals generated by at least one pair of gas pressure sensors respectively setting at an inside and an outside of a door or a window and obtaining gas pressure values of indoor environment and outdoor environment according to the gas pressure signals, wherein the method further comprises:
receiving the gas pressure signals generated by the at least one pair of gas pressure sensors at intervals;
obtaining the gas pressure values of indoor and outdoor environments each time when receiving the gas pressure signals; and
comparing currently obtained gas pressure values of indoor and outdoor environments to the gas pressure values of indoor environment and outdoor environment obtained previously, to determine whether the gas pressure values of indoor environment and outdoor environment are changed and determine the magnitudes of changes;
controlling a camera to capture photos or videos when determining the gas pressure values of indoor and outdoor environments, detected by one pair of gas pressure sensors are changed and magnitudes of changes of the gas pressure values are both within a preset gas pressure range; and
transmitting the photos and videos captured by the camera to at least one validated contact according to preset contact information.

12. The method according to claim 11, further comprising:
generating or modifying the preset gas pressure range and the preset contact information in response to operations of the validated contact and storing the preset gas pressure range and the preset contact information to a storage device.

13. The method according to claim 11, further comprising:
associating two pressure sensors of each pair of gas pressure sensors setting at one door or window with the camera setting at the same door or window in response to a setting operation of the validated contact when an amount of the at least one pair of gas pressure sensors is greater than one.

14. The method according to claim 13, further comprising:
judging whether two gas pressure sensors are associated with each other when determining the gas pressure values detected by two gas pressure sensors are changed and the magnitudes of changes both are within the preset gas pressure range; and
controlling the determined camera to capture the photos and videos when judging the two gas pressure sensors are associated with each other.

15. The method according to claim 13, wherein the step of associating two pressure sensors of each pair of gas pressure sensors setting at one door or window with the camera setting at the same door or window comprises:
associating the two pressure sensors of each pair of gas pressure sensors setting at one door or window with the camera setting at the same door or window by associating device identification codes of the two pressure sensors and the camera.

* * * * *